United States Patent [19]

Margraf

[11] Patent Number: 4,629,480
[45] Date of Patent: Dec. 16, 1986

[54] STRATIFIED BULK MATERIAL FILTER

[76] Inventor: Adolf Margraf, Am Schleplingsbach 46, 3060 Stadthagen, Fed. Rep. of Germany

[21] Appl. No.: 757,281

[22] Filed: Jul. 19, 1985

[30] Foreign Application Priority Data

Jul. 21, 1984 [DE] Fed. Rep. of Germany ....... 3426959

[51] Int. Cl.⁴ .............................................. B01D 46/00
[52] U.S. Cl. ......................................... 55/282; 55/96; 55/302; 55/479; 55/474
[58] Field of Search ...................... 55/96, 99, 282, 302, 55/79, 479, 474, 512

[56] References Cited

U.S. PATENT DOCUMENTS 1,095,676  5/1914  Rigg ...................................... 55/479

FOREIGN PATENT DOCUMENTS 2119675 11/1983 United Kingdom ................. 55/474
559482 12/1979 U.S.S.R. ................................. 55/302
717818  5/1982 U.S.S.R. ................................. 55/302

Primary Examiner—Bernard Nozick
Attorney, Agent, or Firm—Balogh, Osann, Kramer, Dvorak, Genova & Traub

[57] ABSTRACT

The housing of the stratified bulk material filter contains several vertical bulk material layers which may be traversed transversely by crude gas flow, and are enflanked at both sides by delimitations and which may be supplied with particulate bulk material from above.

A periodically occurring flushing-gas counterflow flushing operation is optionally combined with lateral and/or bottom bulk material extraction, whereby an adsorption of noxious gases and/or separation of particles from the crude gas is resolved advantageously by appropriate selection of the possible combination, in a simple structure.

6 Claims, 6 Drawing Figures

STRATIFIED BULK MATERIAL FILTER

BACKGROUND OF THE INVENTION

1. Field of Invention

The invention relates to a stratified bulk material filter, in which a housing receives several vertical filter layers of bulk material which are transversely traversable by gas flow, are enflanked at both sides by limitations may be charged with bulk material from above and from which bulk material is extracted, the one side of each of the layers delimiting a flow arrival space of a crude gas and the oppositely situated side delimiting a flow departure side for purified gas.

In the case of stratified bulk material filters of this kind, the bulk material consists of granular material, e.g. fine gravel, for deposition of particles from the crude gas and/or for example granules or granular calcium carbonate for dry adsorption of noxious gases contained in the crude gas, and/or of granules for instigation of a catalytic action on chemical reactions.

2. Description of the Prior Art

The bulk material in vertical layers of bulk material traversed transversely by gas flow is primarily charged by deposited particles at the flow arrival side, in almost all practical applications. It is advantageous for this reason that the bulk material be freed of particles selectively at the flow arrival side, or rather that greatly contaminated grains or such as are exhausted by adsorption are removed from the layer of bulk material and are replaced by uncontaminated particles which slip into position. To secure removal and/or exchange of particles, it has already been proposed in DE-OS No. 32 46 183 that the delimitation of the bulk material layers should be so constructed at the flow arrival side that slopes of the bulk material may form, for example on horizontal surfaces or horizontal branches of angular delimiting sections. By imposing oscillations or tipping displacements on the horizontal sections of the delimitations, adhering dust and bulk material particles of the slopes may be caused to drop down sideways to be extracted, and replaced by after-sliding bulk material particles, to secure the adequate adsorption of noxious gases or to keep the throughflow resistance as low as possible throughout the service period of the filter. The known aforesaid embodiment comprises a complex, heavy and costly structure in practice and has not gained acceptance for this reason.

It is also known from DE-B No. 12 41 243 and DE-B No. 16 57 125 that bulk material of bulk material layers on which particles adhere during the throughflow of crude gas may be freed from adhering particles by a counterflow flushing operation. To this end, the bulk material was installed in bulk material layer filters within horizontal boxes or containers having a permeable bottom and a permeable or open top and the bulk material was then traversed for cleaning purposes by a pure gas in counterflow to the crude gas, to free and remove the particles deposited on the bulk material from the crude gas. Whilst doing so, the bulk material always remains the same in the containers. It has been frequently observed that in operation of this structure of the bulk material layers an unequal throughflow of the crude gas occurred since the cleansing of the bulk material could not be performed with sufficient uniformity across the flow impingement surface and the crude gas then preferentially flowed through the bulk material areas which had been most extensively cleansed and consequently had the lowest resistance. The forming of cavities could not be averted under all conditions.

OBJECTS AND SUMMARY OF THE INVENTION

The object of the invention consists in securing an effective cleaning action on adhering particles, as and when required, and if need be in the case of adsorption a selective replacement of the charged or exhausted bulk material primarily at the flow impingement side achieved in uncomplicated manner.

In accordance with the invention in a stratified bulk material filter for crude gas, in which a housing adjacently receives advantageously several vertical layers of bulk or loose material enflanked on opposite sides by delimitations and which are transversely traversable by flow, and may be charged from above with bulk material and from which bulk material may be extracted, one side of each layer delimiting the flow arrival space for a crude gas and the oppositely side delimiting the flow departure side for purified gas, means are provided for a brief cyclic flushing gas counterflow flushing operation for the vertical bulk material layers in a direction opposite to the crude gas flow, and means for extraction of bulk material from, and a means for bulk material replenishment to the bulk material layers.

In accordance with the invention, use is consequently made of an easily performed brief counterflow flushing operation being counterflow of compressed gas for cleansing and removal of bulk material in vertical bulk material layers, the bulk material charged particularly heavily with particles from the crude gas being cleansed at least partially at the flow impingement side during the counterflow flushing operation in almost all practical instances, whilst at the same time a removal of bulk material is also performed either by sideways extraction of bulk material caused by the counterflow flushing operation, or by removal of bulk material at the bottom from the bulk material layer. Both possibilities of extraction may be utilised at the same time or successively.

As a result of the counterflow flushing operation with sideways removal of bulk material, the bulk material present at the flow departure side which is affected in lesser degree by adsorption and/or by particles from the crude gas, is gradually caused to travel to the flow arrival side from the flow departure side by the successive counterflow flushing operations, at which it may thereupon be removed sideways. Suitably the delimitations of the bulk material layers at the flow arrival side consist of unconfined slopes of bulk material particles supported on horizontal surfaces, or of spaced rigid strips or surfaces having perforations having dimensions greater than the grain size of the bulk material. A transport of bulk material particles against the direction of crude gas flow, i.e. in the counterflow direction is thus caused in an uncomplicated manner.

When utilising delimitations comprising spaced strips or surfaces comprising openings or perforations having the aforesaid dimensions, it should be understood that the particles form a slope from or within the perforations or openings and may be induced to leave the bulk material layer only by an extraneous action. A brief counterflow flushing operation or a brief pressure surge directed against the crude gas flow, is such an extraneous action which achieves the result.

Where the delimitations at crude gas arrival sides comprise free bulk material slopes defined at spaced rigid strips, or walls which have perforations with dimensions greater than the particle size of the bulk material and/or the means for bulk material extraction comprise a bottom extraction grid.

The counterflow flushing operation performs a cleansing action on the bulk material particles charged with particles on the one hand, and on the other hand a partial lateral removal of bulk material, which may be cleansed or regenerated outside the filter and may be returned to the bulk material layers again, in known manner.

An intensification of the lateral outflow of used or exhausted bulk material may be obtained by the fact that every bulk material layer is provided with a bottom extraction grid which may be set briefly and simultaneously with or independently of the counterflow flushing operation for bottom removal of bulk material. Thanks to this brief bottom removal, the slope of the particles before or at the perforations is loosened, and the lateral extraction caused by the counterflow flushing operation is intensified.

BRIEF DESCRIPTION OF THE DRAWINGS

The invention will now be described, by way of example, with reference to the accompanying partly diagrammatic drawings, in which.

DETAILED DESCRIPTION OF THE PREFERRED EMBODIMENT

Figure 1:
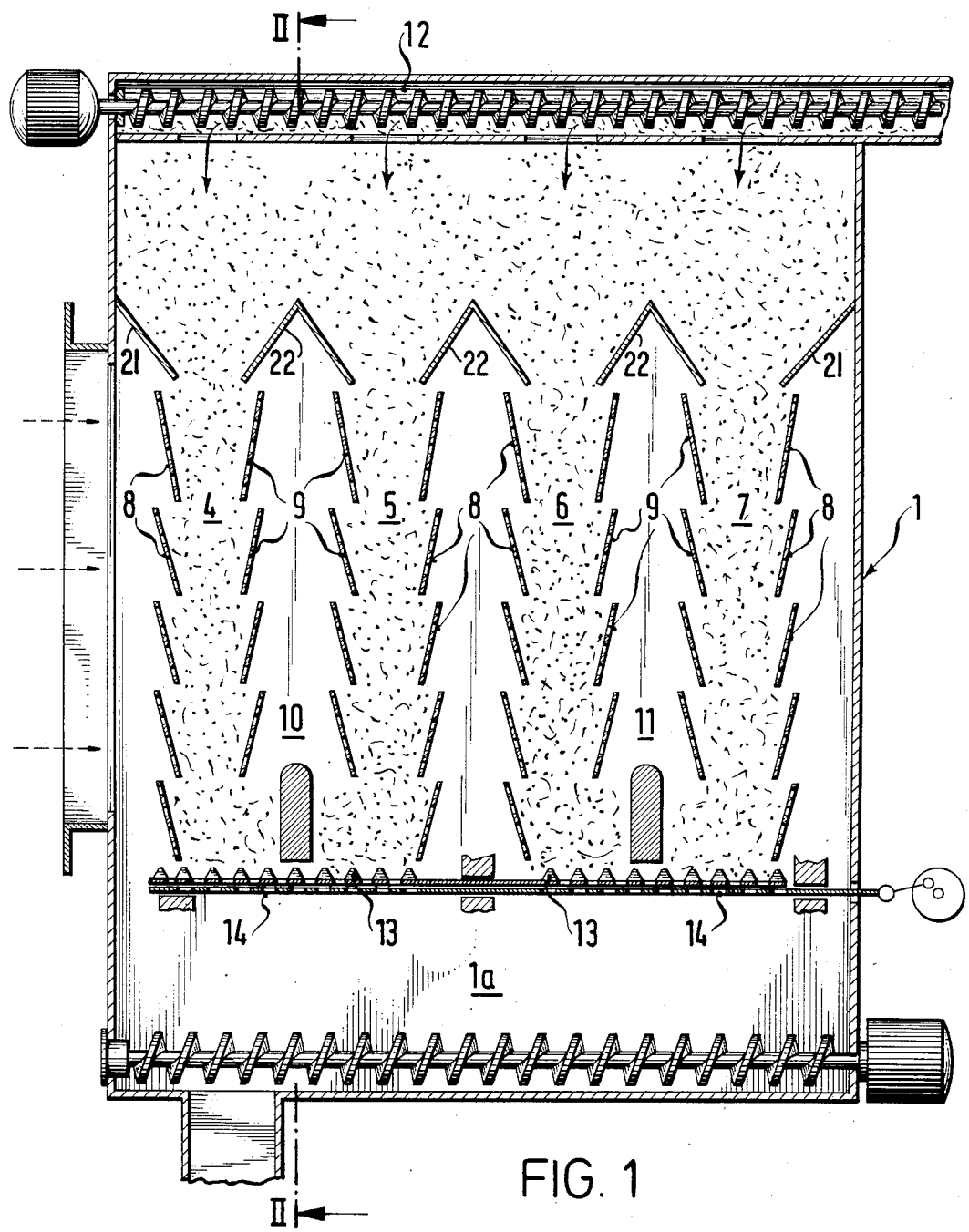
FIG. 1 is a vertical longitudinal cross-section of a stratified bulk material filter.
Figure 2:
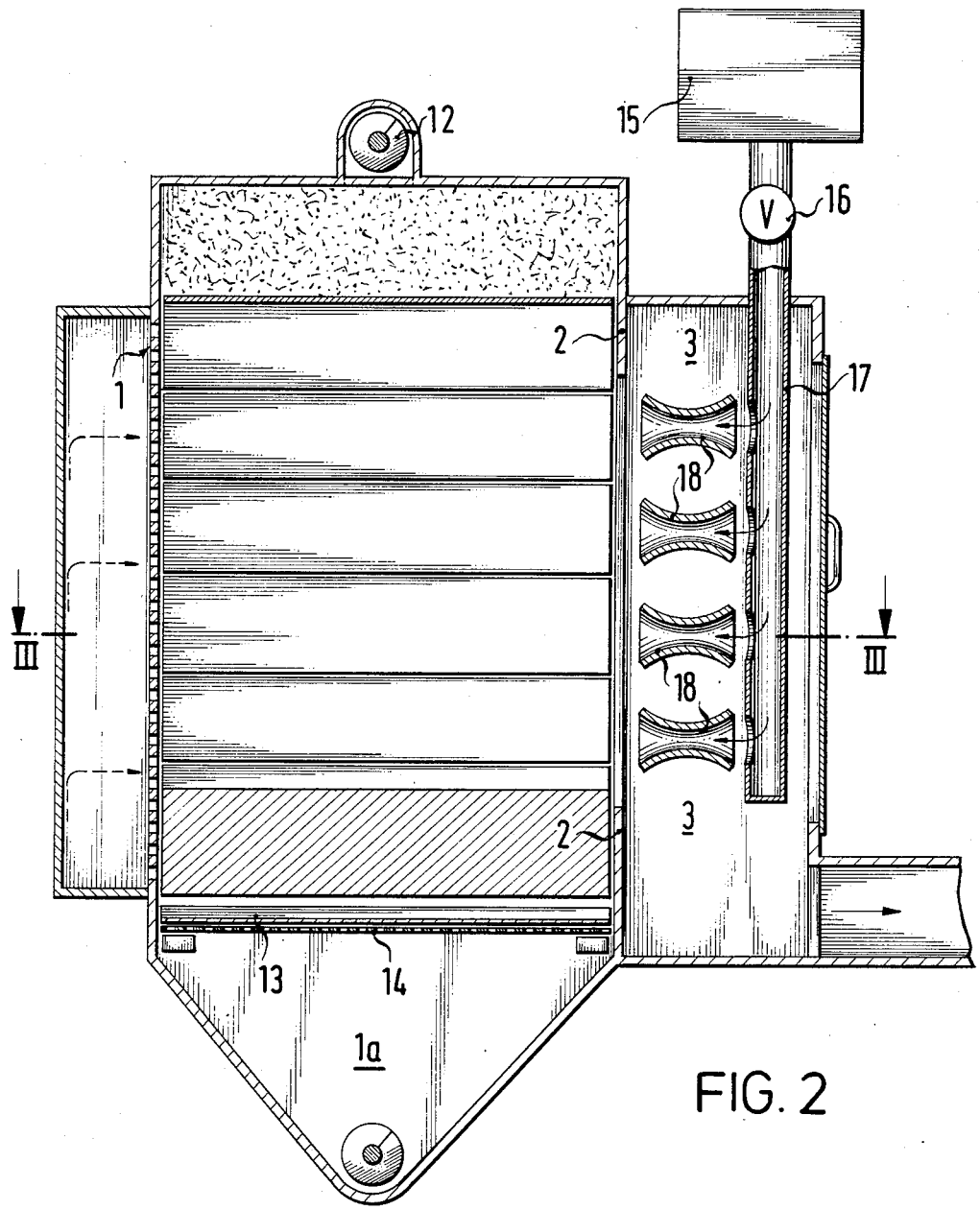
FIG. 2 is a vertical cross-section along the line II—II of FIG. 1.
Figure 3:
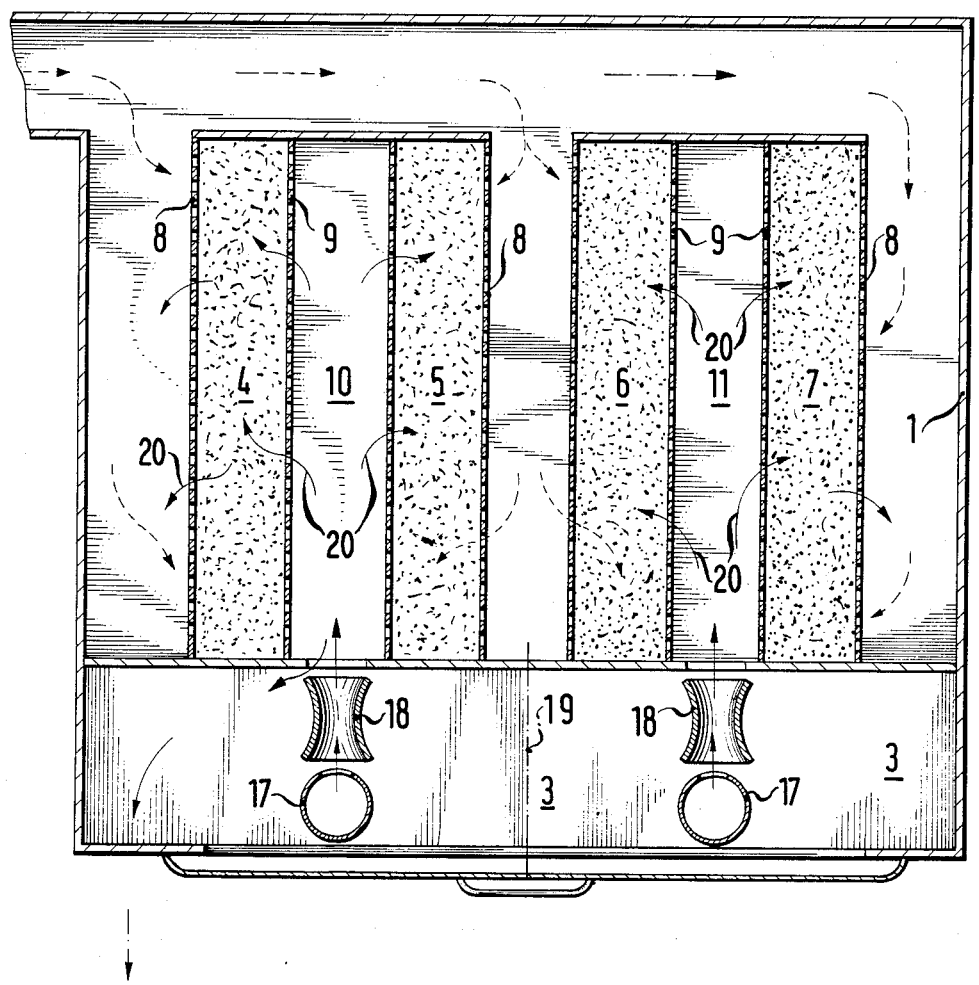
FIG. 3 is a horizontal cross-section along the line III—III of FIG. 2, FIG. 4 diagrammatically shows an individual bulk material layer 4 of FIGS. 1 and 3, FIG. 5 diagrammatically shows an individual bulk material layer having a modified lateral delimitation at the flow arrival side, and FIG. 6 diagrammatically shows another individual bulk material layer with delimitation by surfaces which comprise perforations.
Figure 4:
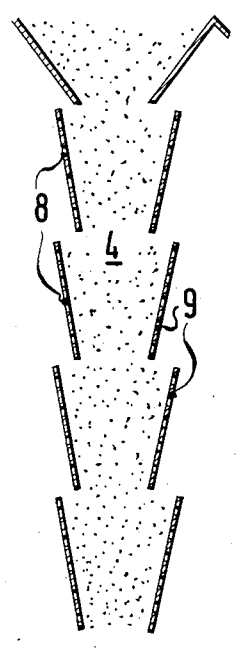
Figure 5:
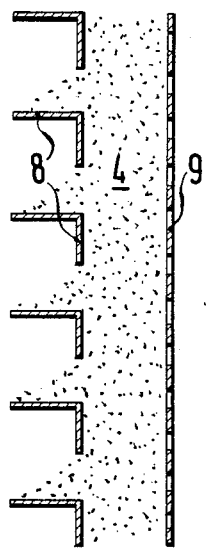
Figure 6:
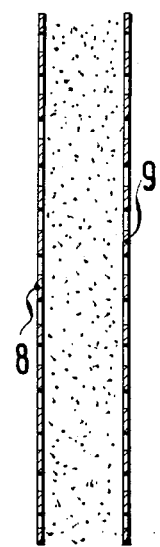

The stratified bulk material filter according to FIGS. 1-3 comprises a housing 1 provided with a crude gas inlet and a purified gas outlet, and which is subdivided by a partition 2 into a crude gas space and a purified gas space 3. Preferably several, e.g. four, vertical bulk material layers 4,5,6 and 7 are situated in the crude gas space, and are enflanked at opposite sides by gas permeable delimitations which for example consist of perforated surfaces or strips of material 8 and 9 which are installed one above the other with an inward and downward inclination from the outside of the layers. It is also possible to install the perforated strips of material adjacently one above another in a plane or to replace the delimitations 8 at the flow arrival side by horizontal areal members or horizontal branches of angular sections, as indicated in FIG. 5. FIG. 6 shows the application of plane delimiting surfaces provided with perforations.

The material strips or surfaces 8 form the flow arrival side of the bulk material layers, whereas the surfaces or strips of material 9 form the flow departure side of the purified crude or flue gas. The delimitation forming the flow departure side may also consist of spaced solid sheet metal strips which force the bulk material to form a slope by oblique positioning and at the same time allow of a gas throughflow.

According to the example, pairs of adjacent bulk material layers, 4, 5 and 6, 7 are associated to form respective purified gas flow departure spaces 10,11. The crude or flue gas is distributed within the housing 1 and flows through the bulk material layers in the direction of the pecked arrows of FIGS. 1 and 3 and then flows as purified gas to the outside via the flow departure spaces 10 and 11 and the purified gas space 3, the flow for example being caused by a suction fan.

The bulk material layers 4 to 7 which are supplied with bulk material from above from a stock via a conveyor screw 12 or the like, are closed off at the bottom or supported by an extraction device, for example comprising a fixed upper grid 13 and a movable bottom grid 14 which latter covers the passages of the upper grid 13 in the inoperative position. The displacement of the bottom grid for removal of bulk material is caused via a crank drive for example.

According to the invention, the strips 8 or surfaces forming the flow arrival sides of the bulk material layers are provided with a perforation or opening of which the dimensions are larger than the diameter of the bulk material grains and bulk material slopes may be formed at the openings. The delimitations 9 at the flow departure side are so formed that no bulk material passes into the flow departure spaces 10 and 11 with the bulk material layers closed off at the bottom, or rather in the case of incorporation of bottom extraction grids, very little bulk material only passes—e.g. in the form of grains of too small a size—into the flow departure spaces 10 and II, which are then in communication at the bottom with the grid.

If the perforations of the strips 8 or surfaces at the flow arrival side of the bulk material layers have a greater diameter than the bulk material grains, no bulk material emerges sideways without a complementary deliberate action, since the grains form a slope at or within the perforations.

To renew the bulk material which is charged with particles or noxious gases or deactivated, at the flow arrival side and to allow for egress of bulk material against the direction of flow arrival of the crude or flue gas, the bulk material grains are energized into a movement whereby they emerge laterally through the perforations and drop downwards.

To accomplish this, a counterflow flushing operation or counterflow compressed gas flushing operation, is performed briefly and cyclically, e.g. in 0.1 to 1 second. To this end, a distributor pipe 17 which may be supplied with compressed gas from a source 15 via an openable valve 16 and has outlet slots directed at nozzles 18 which for their part are directed into the purified gas flow departure spaces 10 and 11, projects into the purified gas space 3.

As soon as the bulk material is excessively charged with particles at the flow arrival side 8, the resistance of the filter being increased thereby, or as soon as the bulk material at the flow arrival side has been deactivated by combining with noxious gases, the valve 16 is opened and a compressed gas surge is applied in counterflow to the crude or flue gas on the bulk material of the two adjacent bulk material layers, which causes the slope-forming grains to be set in motion before or within the perforations at the flow arrival side 8 and thereby to emerge sideways out of the layers through the perforations of greater diameter or out of the bulk material slopes, and to drop down whilst fresh bulk material drops down from above in replenishment into the bulk material layers.

So that a displacement of the grains may occur at the flow arrival side during the counterflow surge in any event, e.g. in the case of the deposition and incorporation of highly adhesive particles, the bottom grid 14 of the supporting grids 13,14 may for example be set in motion briefly and simultaneously with the pulse, so that bulk material is removed at the bottom and the bulk material layer is thereby placed in motion from the top towards the bottom. The compaction of the grains is loosened thereby and the lateral extraction of grains by the flushing gas pulse is intensified.

Instead of the compressed gas counterflow flushing operation by means of the embodiment described, a different flushing gas flow may also be generated, e.g. as described in the German patent application No. P 33 41 065.8-23.

It may be advantageous in special cases to form the separating surfaces at the flow arrival side so that bulk material grains cannot pass through the perforations for which reason their dimensions are then kept smaller than the diameter of the grains. In this case, the extraction of bulk material then occurs exclusively via a bottom extraction grid, the periodic counterflow flushing action being retained as an important complement. This combination is advantageous, for example if for special reasons the layer of bulk material is to be replaced practically in toto in one operation from time to time, to resolve problems posed regarding adsorption of noxious gases. If, in this connection, the crude gas is also charged with particles apart from noxious gases, these are preferentially deposited on or in the flow arrival section and generate an undesirable rise in flow resistance. It is consequently necessary during the dwell period of the bulk material to remove the particles towards the side and finally to cause these to drop into the collector space 1a, by means of the counterflow flushing action, advantageously coupled by a simultaneous and consequently very brief removal of extremely small grains at the bottom.

So that the particles merging laterally from the delimitations 8 have enough time to drop into the bottom collector space 1a in the case of a necessary and extensive separation of particles, the bulk material filter is divided advantageously into chambers—advantageously at least in the region of the purified gas space 3, so that for example one pair of bulk material layers 4,5 and 6,7 is allocated to each chamber. The division into chambers is denoted by the dash-dotted line 19 in FIG. 3. A separation of the chamber against being acted upon by crude or flue gas will then be retained during and after the counterflow gas flushing action performed in a chamber, until the laterally emerging particles have dropped in free fall downwards into the collector space 1a. A redeposition of cleaned-off particles before reaching the collector space 1a after completion of a brief counterflow action is thereby prevented Whilst the invention and many of its attendant advantages will be understood from the foregoing description, it will be apparent that various changes may be made in the form, construction and arrangement of the parts without departing from the spirit and scope of the invention or sacrificing all of its material advantages, the form hereinbefore described merely being a preferred embodiment.

What is claimed is:

1. In a crude gas filter having layers of granulated bulk material, the filter comprising a housing provided with a crude gas inlet and a purified gas outlet, and being subdivided by a partition into a crude gas spaced and a purified gas space, a plurality of vertical bulk material layers disposed in said crude gas space, said layers feedable from the top of said crude gas space and closed off and the bottom thereof, gas permeable members defining the bulk material layers on opposite sides thereof so as to form a crude gas flow arrival space on one side of the bulk material layers and a purified gas flow departure space on the opposite side thereof, loose bulk material of the layers being formed in slopes at the gas permeable members, means for supplying or replenishing bulk material to the bulk material layers and means for extraction of bulk material from the bulk material layers, which means communicate with the bottom of the bulk material layers, the improvement which comprises said gas permeable members forming the crude gas flow arrival sides of the bulk material layers are provided with perforations having a diameter larger than the diameter of the bulk material grains and the bulk material slopes are formed from within the perforations, and said gas permeable members forming the purified gas flow departure sides are so formed that no bulk material passes therethrough into the purified gas flow departure space, means for providing a cyclic flushing compressed gas counterflow for flushing and cleansing the bulk mterial layers in a flow direction contrary to that of the crude gas, said flushing gas counterflow providing means comprising a source of compressed gas, a distributor pipe for compressed gas connected to the compressed gas source and projecting into the purified gas space, at least one nozzle communicating with said distributor pipe and spaces so as to facilitate a brief cyclic counterflow flushing and cleansing of the bulk material layers at the crude gas flow arrival sides and a simultaneous lateral removal or sideways extraction of charged or exhausted bulk material of the bulk material slopes at the crude gas flow arrival sides, and said bulk material extraction means comprising a bottom extraction grid acting briefly and simultaneously with said flushing gas counterflow providing means for bottom removal of the bulk material, so that, as bulk material is removed at the bottom, the bulk material layers are thereby placed in motion from the top towards the bottom.

2. The improved filter of claim 1, wherein said permeable gas members comprise spaced strips or surfaces and free bulk material slopes are defined at said spaced strips or surfaces.

3. The improved filter according to claim 1, wherein the bulk material bottom extraction grid is adapted for intermittent operation and operates independently and successively to said flushing gas counterflow providing means.

4. The improved filter according to claim 1, wherein pairs of adjacent ones of the bulk material layers define within the crude gas space purified gas flow departure spaces situated between the layers of each pair and said at least one nozzle for compressed gas is directed into the purified gas flow departure spaces.

5. The improved filter according to claim 1, wherein pairs of adjacent ones of the bulk material layers are separated from each other at the purified gas space and each pair is arranged to be isolated from said supply of crude gas and connected to said flushing gas counterflow providing means.

6. The improved filter according to claim 1, wherein a bottom extraction grid is provided for each of the bulk material layers to set briefly and simultaneously with said flushing gas counterflow providing means for bottom removal of bulk material.

* * * * *